United States Patent
Yuasa

(10) Patent No.: US 8,774,953 B2
(45) Date of Patent: Jul. 8, 2014

(54) INFORMATION PROCESSING DEVICE, CONTROL METHOD THEREFOR, AND PROGRAM

(75) Inventor: Nobuyuki Yuasa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1028 days.

(21) Appl. No.: 12/492,313

(22) Filed: Jun. 26, 2009

(65) Prior Publication Data

US 2009/0323984 A1 Dec. 31, 2009

(30) Foreign Application Priority Data

Jun. 27, 2008 (JP) .................. 2008-169475

(51) Int. Cl.
*G06F 17/00* (2006.01)
*G10H 5/00* (2006.01)
*G10H 1/00* (2006.01)
*G06K 9/00* (2006.01)

(52) U.S. Cl.
USPC ............... 700/94; 84/673; 381/118; 382/103

(58) Field of Classification Search
USPC ........... 84/600, 671, 672, 673, 692, 693, 699; 381/118; 382/103, 106, 107, 154, 236; 700/94
See application file for complete search history.

(56) References Cited

U.S. PATENT DOCUMENTS

| 5,548,346 | A | * | 8/1996 | Mimura et al. ............... 348/738 |
| 6,687,382 | B2 | * | 2/2004 | Nagahara et al. ............ 382/107 |
| 2004/0104935 | A1 | * | 6/2004 | Williamson et al. ......... 345/757 |
| 2004/0119889 | A1 | * | 6/2004 | Ogata ........................... 348/515 |
| 2006/0132714 | A1 | * | 6/2006 | Nease et al. .................. 352/244 |
| 2007/0126928 | A1 | * | 6/2007 | Klompnhouwer et al. ... 348/497 |
| 2009/0252379 | A1 | * | 10/2009 | Kondo et al. ................. 382/107 |

FOREIGN PATENT DOCUMENTS

| JP | 5-19729 | 1/1993 |
| JP | 7-49763 | 2/1995 |
| JP | 2000-69391 | 3/2000 |

* cited by examiner

*Primary Examiner* — Jesse Elbin
(74) *Attorney, Agent, or Firm* — Canon USA Inc. IP Division

(57) ABSTRACT

An information processing device according to an embodiment of the present invention includes the following elements: a detection unit configured to detect an amount of change in position of an image data item that is displayed on a display screen; and a processing unit configured to perform image processing on the image data item in accordance with a detection result that is obtained by the detection unit, and to perform audio processing on an audio data item corresponding to the image data item in accordance with the detection result that is obtained by the detection unit.

10 Claims, 3 Drawing Sheets

INFORMATION PROCESSING DEVICE, CONTROL METHOD THEREFOR, AND PROGRAM

BACKGROUND OF THE INVENTION

1. Field of the Invention

The present invention relates to a technology for performing processing on an image data item and an audio data item corresponding to the image data item in accordance with an amount of movement of the image data item on a display screen.

2. Description of the Related Art

Hitherto, as a method for outputting audio data items when a plurality of image data items (including still image data items) are displayed, a method for selecting one image data item from among the displayed image data items, and for outputting only an audio data item corresponding to the image data item has been known.

For example, in Japanese Patent Laid-Open No. 5-19729, a technology is disclosed, in which the sound volume of audio data items corresponding to image data items is adjusted in accordance with the size of the image data items and overlaps among the image data items on a screen, and in which the audio data items are combined together and output.

Furthermore, in Japanese Patent Laid-Open No. 7-49763, a technology is disclosed, in which filter processing is performed on audio data items corresponding to image data items in accordance with the size of the image data items and overlaps among the image data items on a screen, and in which the audio data items are combined together and output.

Additionally, in Japanese Patent Laid-Open No. 2000-69391, a technology is disclosed, in which the sound volume and sound field of audio data items corresponding to image data items is adjusted in accordance with the size and position of the image data items on a screen, and in which the audio data items are combined together and output.

Conventionally, a method has been employed, in which the balance between an audio data item that is heard from a left speaker and an audio data item that is heard from a right speaker is adjusted, the audio data items corresponding to image data items. However, there is a problem that the method has a low directivity, and that it is difficult to distinguish a plurality of sounds from one another using the method.

Furthermore, there is also a problem that, when image data items are moved, it is difficult to determine, simply by adjusting the sound volume and sound field of the image data items, which image data item is moving.

SUMMARY OF THE INVENTION

In view of the above-described problems, the present invention provides an information processing device for more easily searching for and selecting an image data item.

An information processing device according to an embodiment of the present invention includes the following elements: a detection unit configured to detect an amount of change in position of an image data item that is displayed on a display screen; and a processing unit configured to perform image processing on the image data item in accordance with a detection result that is obtained by the detection unit, and to perform audio processing on an audio data item corresponding to the image data item in accordance with the detection result that is obtained by the detection unit.

According to the embodiment of the present invention, a position of an image data item can be grasped not only using a result of performance of image processing on the image data item but also using a result of performance of an audio processing on an audio data item. Thus, search and selection of an image data item can be easily performed.

Further features of the present invention will become apparent from the following description of exemplary embodiments with reference to the attached drawings.

DESCRIPTION OF THE EMBODIMENTS

Figure 1:
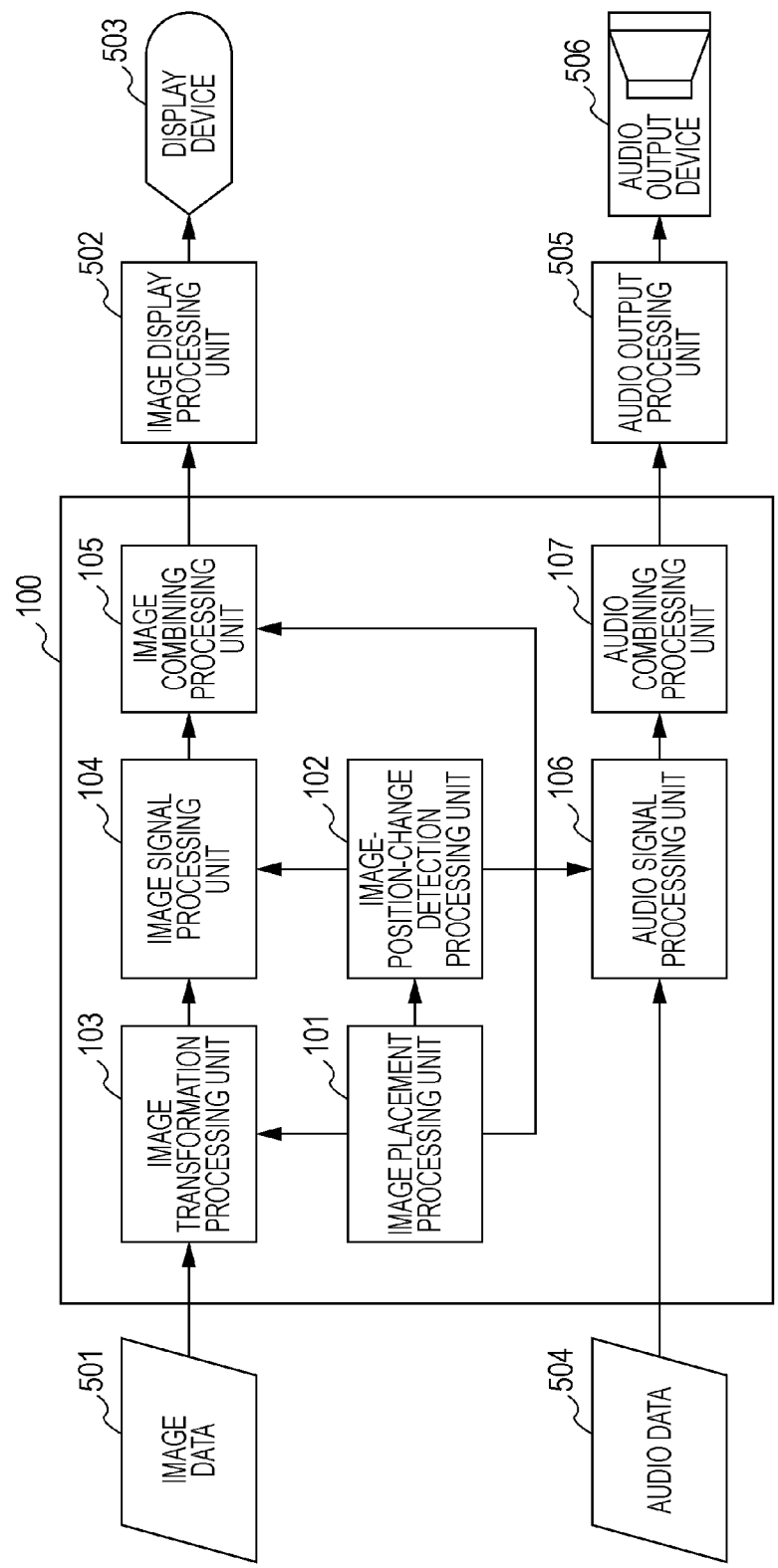
FIG. 1 is a block diagram of a configuration of an image audio output device according to an embodiment of the present invention.

FIG. 1 is a block diagram of a configuration of an image audio output device according to an embodiment of the present invention. Referring to FIG. 1, reference numeral 100 denotes a body of the image audio output device according to the present embodiment. Reference numeral 501 denotes an image data item to be input to the image audio output device 100. Reference numeral 504 denotes an audio data item to be input to the image audio output device 100. Note that the image audio output device 100 is configured as an application example of an information processing device according to the present invention. Furthermore, the image data item 501 and the audio data item 504 are configured as application examples of an image data item and an audio data item according to the present invention, respectively.

Reference numeral 101 denotes an image placement processing unit that determines a position of an image data item which is input to the image audio output device 100 in a two-dimensional region including a display region of a display device 503.

Reference numeral 102 denotes an image-position-change detection processing unit which detects that a position of an image data item which was placed by the image placement processing unit 101 has been changed, and that calculates an amount of change in the position of the image data item. The image-position-change detection processing unit 102 is configured as an application example of a detection unit according to the present invention.

Reference numeral 103 denotes an image transformation processing unit that transforms, e.g., enlarges or reduces, a two-dimensional shape of an image data item which is input to the image audio output device 100, and that outputs the image data item. The image transformation processing unit 103 is configured as an application example of a transformation processing unit according to the present invention.

Reference numeral 104 denotes an image signal processing unit that performs signal processing, such as spatial-frequency filter processing, on an image data item that is obtained by the image transformation processing unit 103. The image signal processing unit 104 is configured as an application example of a processing unit according to the present invention.

Reference numeral 105 denotes an image combining processing unit that places a group of image data items which are output from the image signal processing unit 104, that combines the image data items together, and that outputs the combined image data items. The image combining processing unit 105 is configured as an application example of an image combining unit according to the present invention.

Reference numeral 106 denotes an audio signal processing unit that performs signal processing, such as audio-frequency filter processing, on an audio data item which is input to the image audio output device 100. The audio signal processing unit 106 is configured as an application example of the processing unit according to the present invention.

Reference numeral 107 denotes an audio combining processing unit that places audio data items which are output from the audio signal processing unit 106, that combines the audio data items together, and that outputs the combined audio data items. The audio combining processing unit 107 is configured as an application example of an audio combining unit according to the present invention.

Reference numeral 502 denotes an image display processing unit that performs data conversion processing for displaying, on the display device 503, a group of image data items which are combined together by the image combining processing unit 105.

Reference numeral 503 denotes a display device such as a liquid crystal display (LCD). Reference numeral 505 denotes an audio output processing unit that performs data conversion processing for outputting, by an audio output device 506, combined audio data items that are output from the audio combining processing unit 107. Reference numeral 506 denotes an audio output device such as a speaker.

Note that, regarding data processing that is performed by each of the above-described units, image data items may be sequentially subjected to the data processing, or all of the image data items may be subjected to the data processing in parallel.

Figure 2:
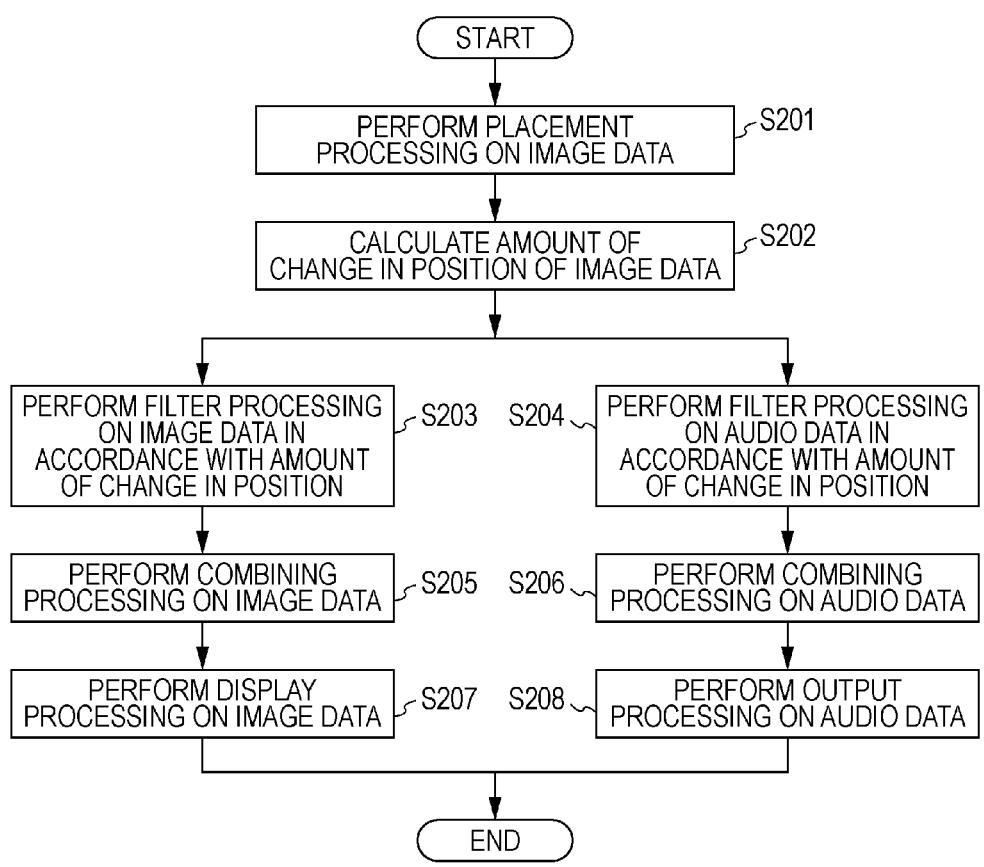
FIG. 2 is a flowchart showing a flow of processing that is performed by the image audio output device according to the embodiment of the present invention.

Next, a flow of processing that is performed by the image audio output device 100 will be described with reference to FIG. 2. FIG. 2 is a flowchart showing the flow of processing that is performed by the image audio output device 100.

First, the image placement processing unit 101 determines a position of the image data item 501, which includes one image data item or a plurality of image data items to be input, in the two-dimensional region including the display region of the display device 503, and places the image data item 501 (step S201). In this placement processing, the image placement processing unit 101 also changes the position of the image data item 501 with time. In other words, the image placement processing unit 101 performs a process of smoothly moving the position of the image data item 501 with time, moving the position of the image data item 501 using increasing or reducing of the speed of the image data item 501, or suddenly placing the image data item 501 at a different position. Furthermore, a user may specify the position of the image data item 501 using a user interface such as a remote controller, thereby determining the position of the image data item 501.

Moreover, the image placement processing unit 101 calculates a parameter for performing image transformation processing on the basis of a position of an image data item. Additionally, in order to detect an amount of change in the position of the image data item, the image placement processing unit 101 calculates and outputs a value of a barycenter of the image data item. The value of a barycenter of the image data item is used for combining processing.

Next, the image-position-change detection processing unit 102 inputs position information (for example, the value of a barycenter) concerning the image data item that is output from the image placement processing unit 101, and calculates an amount of change in position of the image data item in each fixed time (step S202). The image-position-change detection processing unit 102 calculates processing parameters for the image signal processing unit 104 and the audio signal processing unit 106 on the basis of the amount of change.

The image data item 501 is input to the image transformation processing unit 103, and is subjected to conversion processing of transforming a two-dimensional shape of an image data item. Herein, the conversion processing, in which the two-dimensional shape of an image data item is transformed, that is performed on the image data item 501 includes an enlargement process, a reduction process, a rotation process, a trapezoidal transformation process, a rectangular transformation process, and so forth. For example, the trapezoidal transformation process can be performed using a method in which coordinate transformation is performed on each input pixel by multiplication using an elongation coefficient and by addition. Furthermore, the conversion processing of transforming the two-dimensional shape of an image data item is performed in accordance with an amount of movement of the position of the image data item per unit time.

The image signal processing unit 104 performs, in accordance with the amount of change in position that is output from the image-position-change detection processing unit 102, filter processing or the like on an image data item that is output from the image transformation processing unit 103 (step S203). For example, special-frequency lowpass filter processing or the like is performed as the filter processing. A coefficient of a filter is changed in accordance with the amount of change in position that is output from the image-position-change detection processing unit 102.

One image data item or a plurality of image data items that are output from the image signal processing unit 104 are combined together by the image combining processing unit 105, and output (step S205). Then, the image display processing unit 502 performs, on the combined image data items, processing for displaying the image data items on the display device 503. The image data items that have been subjected to the processing by the image display processing unit 502 are displayed on the display device 503 (step S207).

Processing described below in each of steps S204, S206, and S208 is performed in parallel with the above-described processing of a corresponding one of steps S203, S205, and S207.

The audio signal processing unit 106 performs, in accordance with the amount of change in position that is output from the image-position-change detection processing unit 102, filter processing or the like on the audio data item 504 corresponding to the image data item 501 (step S204). For example, audio-frequency lowpass filter processing or the like is performed as the filter processing. A coefficient of a filter is changed in accordance with the amount of change in position that is output from the image-position-change detection processing unit 102.

One audio data item or a plurality of audio data items that are output from the audio signal processing unit 106 are combined together by the audio combining processing unit 107, and output (step S206). The audio data items may be combined together using a method in which the audio data items are simply added one by one. Alternatively, combining with consideration of sound fields may be performed in accordance with the positions of the image data items.

The audio output processing unit 505 performs, on the combined audio data items, processing for outputting the audio data items to the audio output device 506. The audio output device 506 outputs the audio data items that have been output from the audio output processing unit 505 (step S208).

Figure 3:
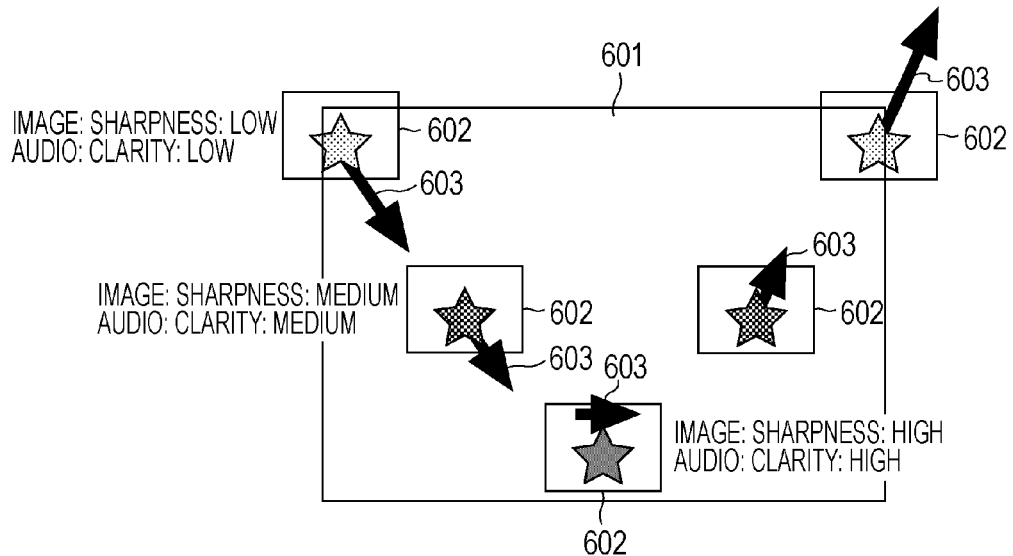
FIG. 3 is an illustration showing a first display example in the embodiment of the present invention.

FIG. 3 is an illustration for explaining changes in display state of an image data item and changes in output state of an audio data item, and the changes are provided in accordance with changes in position of the image data item on the display device 503. Herein, reference numeral 601 denotes a display region of the display device 503. Reference numeral 602 denotes image data items that are displayed on the display region 601. Arrows, which are denoted by reference numeral 603, indicate amounts of changes in position of the image data item 602. The display state of the image data item 602 that is shown in a display example of FIG. 3 changes as follows: the image data item 602 is displayed on the upper-left side of the display region 601; the image data item 602 moves in a lower-right direction to the lower center side of the display region 601 while the speed of the image data item 602 is being reduced; and then, the image data item 602 moves in an upper-right direction to the upper-right side of the display region 601 while the speed of the image data item 602 is being increased.

In the present embodiment, when the amount of change in position of the image data item 602 per unit time is smallest, i.e., when the image data item 602 is positioned on the lower center side of the display region 601, a lowpass filter process of not markedly attenuating high frequency components of a spatial frequency is performed on the image data item 602. Simultaneously, a lowpass filter process of not markedly attenuating high frequency components of an audio frequency is also performed on an audio data item corresponding to the image data item 602. As a result, the highest sharpness of the image data item 602 is obtained, and the highest clarity of the corresponding audio data item is obtained.

Furthermore, when the amount of change in position of the image data item 602 per unit time is largest, i.e., when the image data item 602 is positioned on the upper-left or upper-right side of the display region 601, a lowpass filter process of markedly attenuating high frequency components of the spatial frequency is performed on the image data item 602. Simultaneously, a lowpass filter process of markedly attenuating high frequency components of the audio frequency is also performed on the corresponding audio data item. As a result, the lowest sharpness of the image data item 602 is obtained, and the lowest clarity of the corresponding audio data item is obtained.

Figure 4:
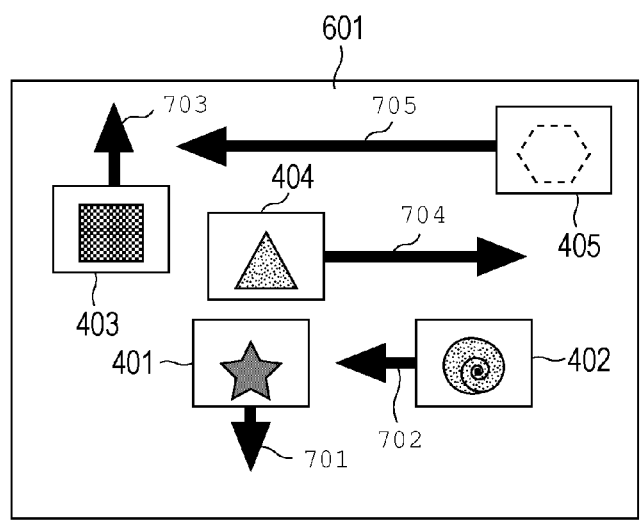
FIG. 4 is an illustration showing a second display example in the embodiment of the present invention.

FIG. 4 is an illustration for explaining, when a plurality of image data items are simultaneously displayed on the display region 601 while the positions of the image data items are being changed, changes in display states of the image data items and changes in output states of audio data items. Reference numeral 405 denotes an image data item that is displayed on the display region 601. An arrow, which is denoted by reference numeral 505, indicates an amount of change in position of the image data item 405.

At a certain time, image data items 701 to 705 move with amounts of changes in movements 501 to 505, respectively. In this case, the lowpass filter process of not markedly attenuating high frequency components of a spatial frequency is performed on image data items having small amounts of changes in positions per unit time, such as the image data items 701, 702, and 703. Furthermore, the lowpass filter process of not markedly attenuating high frequency components of an audio frequency is performed on audio data items corresponding to the image data items 701, 702, and 703. As a result, the highest sharpness of an image data item is obtained as the sharpness of the image data items 701 to 703, and the highest clarity of an audio data item is also obtained as the clarity of the corresponding audio data items.

Additionally, the lowpass filter process of markedly attenuating high frequency components of a spatial frequency is performed on image data items having large amounts of changes in positions per unit time, such as the image data items 404 and 405. The lowpass filter process of markedly attenuating high frequency components of an audio frequency is performed on audio data items corresponding to the image data items 404 and 405. As a result, the lowest sharpness of an image data item is obtained as the sharpness of the image data items 404 to 405, and the lowest clarity of an audio data item is also obtained as the clarity of the corresponding audio data items.

As described above, in the present embodiment, filter processing is performed on a moving image data item, and filter processing is also performed on an audio data item corresponding to the image data item. More specifically, the lowpass filter process of not markedly attenuating high frequency components of a spatial frequency is performed on an image data item having a small amount of change in position per unit time. Furthermore, simultaneously, the lowpass filter process of not markedly attenuating high frequency components of an audio frequency is performed on an audio data item corresponding to the image data item. In other words, low-level blurring processes are performed on the image data item and the audio data item.

In contrast, the lowpass filter process of markedly attenuating high frequency components of a spatial frequency is performed on an image data item having a large amount of change in position per unit time. Simultaneously, the lowpass filter process of markedly attenuating high frequency components of an audio frequency is performed on an audio data item corresponding to the image data item. In other words, high-level blurring processes are performed on the image data item and the audio data item.

Thus, for example, in a case in which content items are browsed, positional relationships among image data items can be grasped using both display states of the image data items and output states of audio data items. Search and selection of an image data item from among the image data items can be easily performed. Furthermore, because filter processing (the blurring processes) is also performed on the audio data items, search of a content item from among the content items can be performed using the output states of the audio data items even when a user does not carefully look at a screen.

Note that, in the above-described embodiment, a coefficient of an audio-frequency lowpass filter is changed in accordance with an amount of movement of the position of an image data item, and filter processing is performed on an audio data item corresponding to the image data item. The present invention is not limited to the above-described embodiment. Audio processing, which corresponds to the filter processing, may be performed on the corresponding audio data item so that an audio pitch is changed in accordance with the amount of movement of the position of the image data item. For example, it is considered that, when the amount of movement of the position of the image data item per unit time is large, the corresponding audio data item is output so that the audio pitch is increased, and that, in contrast, when the amount of movement of the position of the image data item per unit time is small, the corresponding audio data item is output so that the audio pitch is decreased.

Note that the present invention can also be realized by obtaining, via networks or various types of storage media, a program that realizes functions of the above-described embodiment, and by executing the program with a processing device such as a computer.

Furthermore, as a matter of course, the aim of the present invention can be achieved using the following method. In other words, a recording medium (or a storage medium) on which a program code (a computer program) of software that realizes the functions of the above-described embodiment is recorded is provided to a system or an apparatus. As a matter of course, the storage medium is a computer-readable storage medium. A computer (a central processing unit (CPU), or a microprocessing unit (MPU)) of the system or apparatus reads and executes the program code that is stored on the recording medium. In this case, the program code that is read from the recording medium realizes the functions of the above-described embodiment, and the recording medium on which the program code is recorded constitutes another embodiment of the present invention.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-169475 filed Jun. 27, 2008, which is hereby incorporated by reference herein in its entirety.

What is claimed is:

1. An information processing device comprising:
   an input unit configured to input image data and audio data;
   a detection unit configured to detect a change amount in position of the image data on a display screen;
   a determination unit configured to determine clarity of the audio data based on the change amount of the image data detected by the detection unit such that the audio data having lower clarity is output when a first change amount is detected in comparison with a case when a second change amount is detected by the detection unit, wherein the first change amount is larger than the second change amount;
   a processing unit configured to perform filter processing on the audio data corresponding to the image data in accordance with the clarity determined by the determination unit; and
   an output unit configured to output the image data and output the audio data processed by the processing unit.

2. The information processing device according to claim 1, wherein the processing unit performs audio-frequency lowpass filter processing on the audio data in accordance with the clarity determined by the determination unit.

3. The information processing device according to claim 1, wherein the processing unit performs audio processing on the audio data so that an audio pitch is changed in accordance with the change amount detected by the detection unit.

4. The information processing device according to claim 1, wherein the determination unit determines clarity of the image data based on the change amount of the image data detected by the detection unit such that the image data having lower clarity is output when the first change amount is detected in comparison with the case when the second change amount is detected by the detection unit, and the processing unit performs filter processing on the image data in accordance with the clarity determined by the determination unit.

5. The information processing device according to claim 4, further comprising:
   an image combining unit configured to combine, first image data processed in accordance with first clarity determined based on a change amount of the first image data and second image data processed in accordance with second clarity determined based on a change amount of the second image data; and
   an audio combining unit configured to combine, first audio data processed in accordance with third clarity determined based on the change amount of the first image data corresponding to the first audio data, and second audio data processed in accordance with fourth clarity determined based on the change amount of the second image data corresponding to the second audio data.

6. The information processing device according to claim 1, further comprising a transformation processing unit configured to transform the image data in accordance with the change amount detected by the detection unit.

7. A method for controlling an information processing device, the method comprising the steps of:
   inputting image data and audio data;
   detecting a change amount in position of the image data on a display screen;
   determining clarity of the audio data based on the change amount of the image data detected by the detecting step such that the audio data having lower clarity is output when a first change amount is detected in comparison with a case when a second change amount is detected by the detecting step, wherein the first change amount is larger than the second change amount;
   performing filter processing on the audio data corresponding to the image data in accordance with the clarity determined by the determining step; and
   outputting the image data and outputting the audio data processed by the performing step.

8. The method according to claim 7, wherein the processing step performs audio-frequency lowpass filter processing on the audio data in accordance with the clarity determined by the determination step.

9. A computer-readable storage medium storing a program for causing a computer to execute the steps of:
   inputting image data and audio data;
   detecting a change amount in position of the image data on a display screen;
   determining clarity of the audio data based on the change amount of the image data detected by the detecting step such that the audio data having lower clarity is output when a first change amount is detected in comparison with a case when a second change amount is detected by the detecting step, wherein the first change amount is larger than the second change amount;
   performing filter processing on the audio data corresponding to the image data in accordance with the clarity determined by the determining step; and
   outputting the image data and outputting the audio data processed by the performing step.

10. The medium according to claim 9, wherein the processing step performs audio-frequency lowpass filter processing on the audio data in accordance with the clarity determined by the determination step.

* * * * *